US011429166B2

(12) United States Patent
Bhaskar et al.

(10) Patent No.: US 11,429,166 B2
(45) Date of Patent: Aug. 30, 2022

(54) SYSTEM AND METHOD FOR MANAGING DEVICE UPDATES

(71) Applicant: Dell Products L.P., Hopkinton, MA (US)

(72) Inventors: Anusha Bhaskar, Bengaluru (IN); Raveendra Madala, Bangalore (IN); Krishnakumar Narasimhan, Chennai (IN); Santosh Gore, Bangalore (IN); Muniswamy Setty, Bengaluru (IN)

(73) Assignee: Dell Products L.P., Hopkinton, MA (US)

( * ) Notice: Subject to any disclaimer, the term of this patent is extended or adjusted under 35 U.S.C. 154(b) by 81 days.

(21) Appl. No.: 16/773,115

(22) Filed: Jan. 27, 2020

(65) Prior Publication Data
US 2021/0232192 A1 Jul. 29, 2021

(51) Int. Cl.
G06F 1/24 (2006.01)
G06F 9/4401 (2018.01)

(52) U.S. Cl.
CPC .............. *G06F 1/24* (2013.01); *G06F 9/4401* (2013.01)

(58) Field of Classification Search
CPC .................................. G06F 1/24; G06F 9/4401
See application file for complete search history.

(56) References Cited

U.S. PATENT DOCUMENTS

| 6,708,231 | B1* | 3/2004 | Kitagawa | G06F 8/65 710/10 |
| 7,953,913 | B2* | 5/2011 | Perry | G06F 21/79 710/200 |
| 8,539,213 | B2 | 9/2013 | Zhang et al. | |
| 9,996,142 | B2 | 6/2018 | Bulusu et al. | |
| 10,177,997 | B1* | 1/2019 | Bromberg | H04L 47/32 |
| 2003/0204710 | A1* | 10/2003 | Culter | G06F 9/4411 713/1 |
| 2005/0144609 | A1 | 6/2005 | Rothman et al. | |
| 2008/0072026 | A1* | 3/2008 | Allison | G06F 9/4418 713/1 |
| 2009/0007089 | A1* | 1/2009 | Rothman | G06F 8/65 717/168 |
| 2009/0307475 | A1* | 12/2009 | Fried | G06F 8/61 713/2 |
| 2011/0143809 | A1* | 6/2011 | Salomone | G06F 1/24 455/550.1 |
| 2013/0268922 | A1* | 10/2013 | Tiwari | G06F 9/4411 717/168 |
| 2016/0266894 | A1* | 9/2016 | Panicker | H04L 67/34 |
| 2017/0357500 | A1 | 12/2017 | Vidyadhara et al. | |
| 2019/0004977 | A1* | 1/2019 | Fanara | G06F 1/24 |

(Continued)

*Primary Examiner* — Zahid Choudhury
(74) *Attorney, Agent, or Firm* — Chamberlain, Hrdlicka, White, Williams & Aughtry

(57) ABSTRACT

An asset includes physical computing resources and a physical computing resources manager. The physical computing resources manager obtains a resource update for the asset; makes a determination that the resource update requires a reset of a portion of the physical computing resources; and, based on the determination, resets the portion of the physical computing resources during a low resource consumption reboot of the asset without resetting a second portion of the physical computing resources, the second portion of the physical computing resources are not reset as part of the low resource consumption reboot.

14 Claims, 8 Drawing Sheets

(56) References Cited

U.S. PATENT DOCUMENTS

| | | | |
|---|---|---|---|
| 2019/0079748 A1* | 3/2019 | Chu | G06F 3/0653 |
| 2019/0199884 A1* | 6/2019 | Shimamura | H04N 1/00965 |
| 2020/0218544 A1 | 7/2020 | Ganesan et al. | |

* cited by examiner

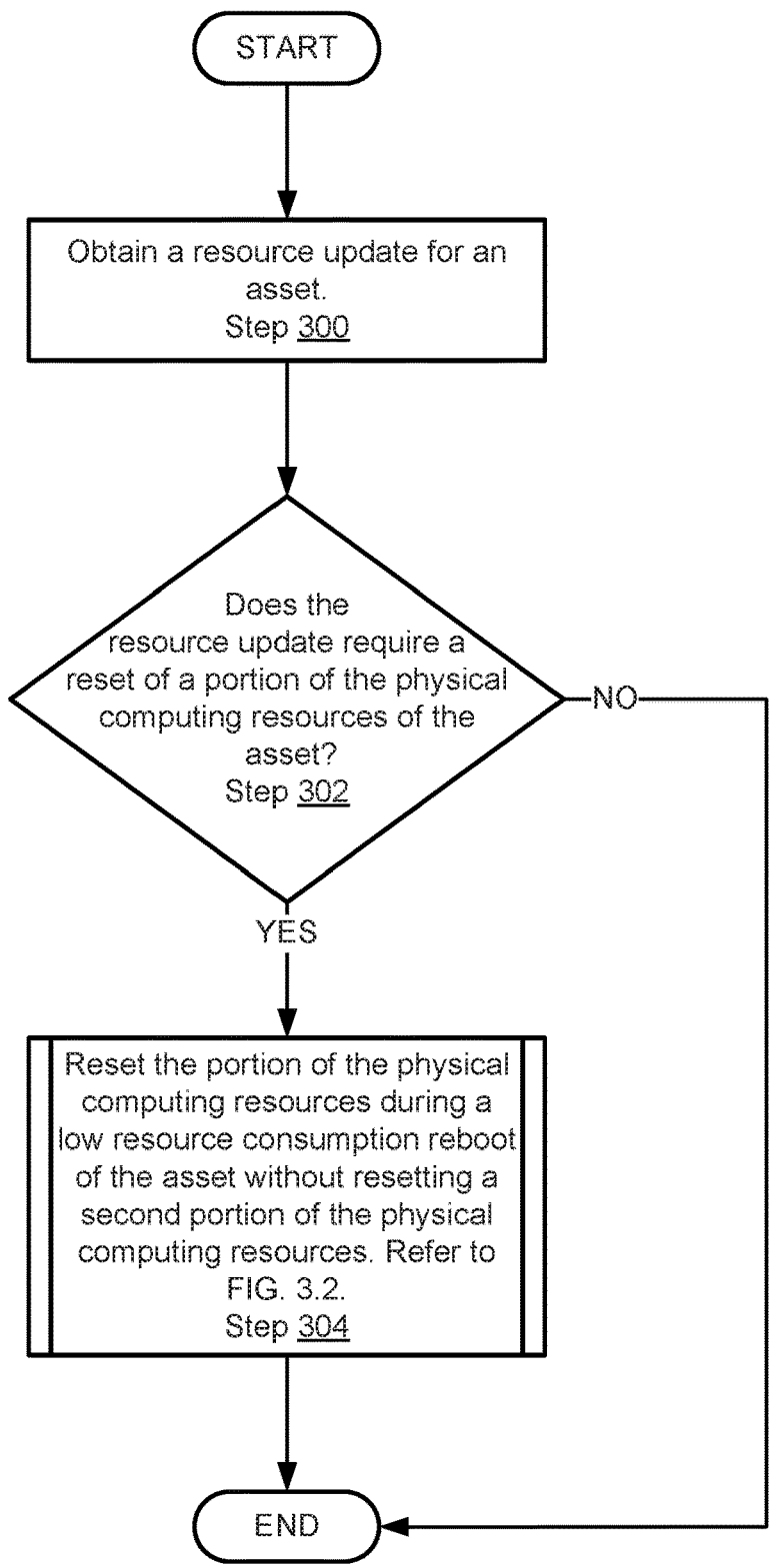
FIG. 3.1

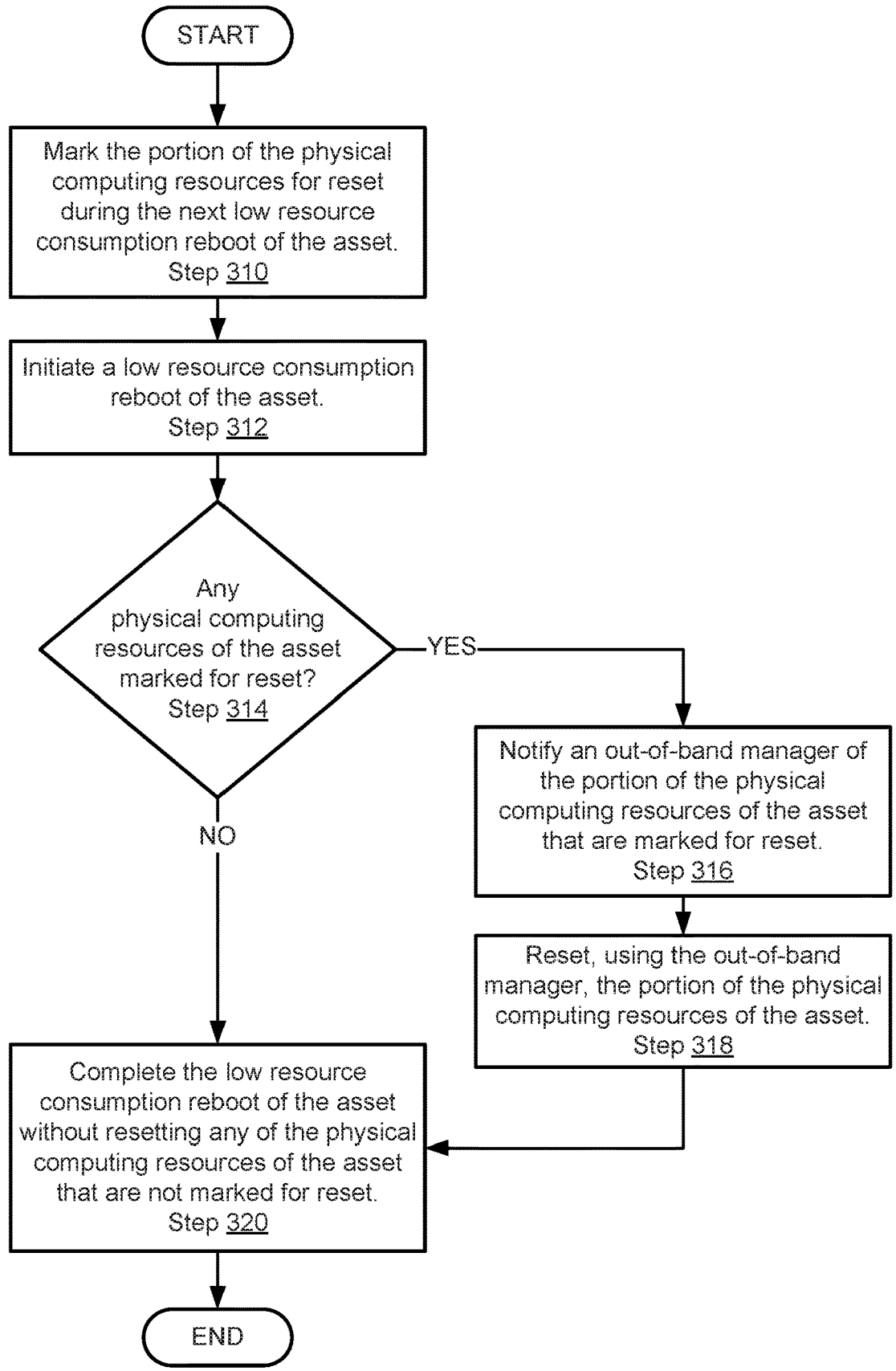
FIG. 3.2

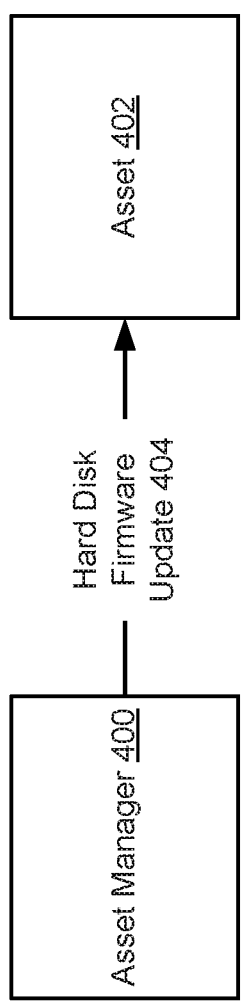
FIG. 4.1

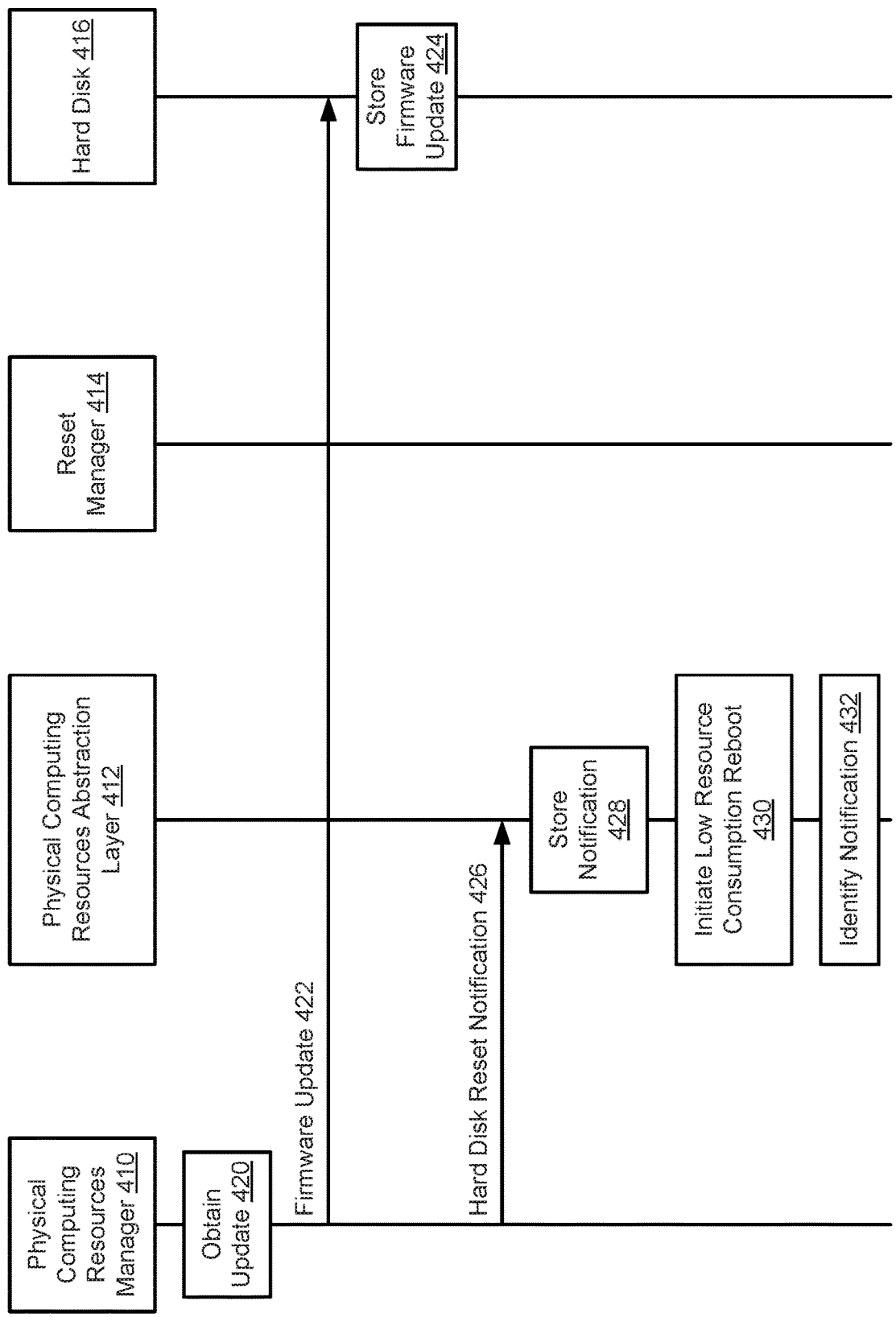
FIG. 4.2

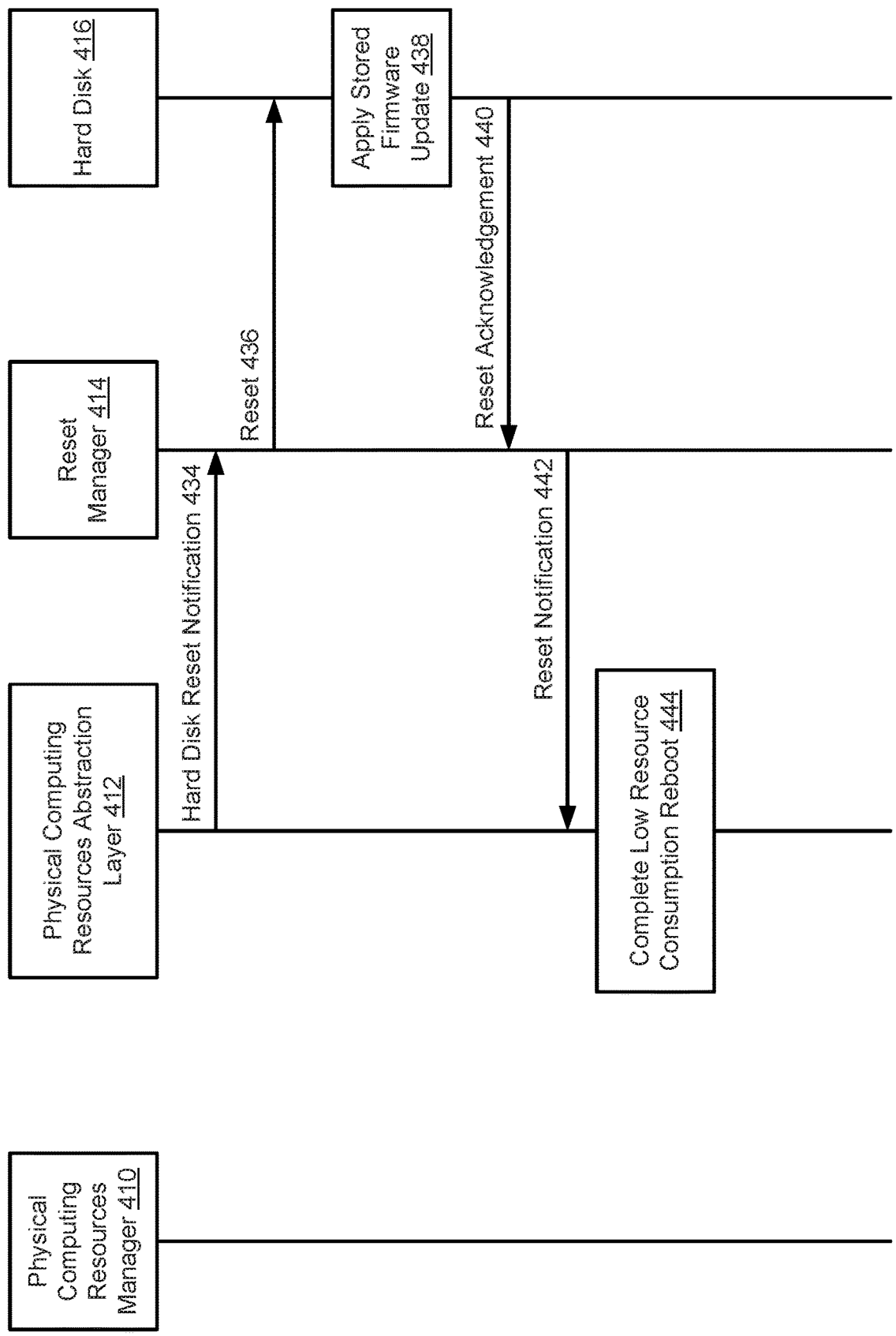
FIG. 4.3

SYSTEM AND METHOD FOR MANAGING DEVICE UPDATES

BACKGROUND

Computing devices may perform services. To provide the services, the computing devices may include hardware components and software components. Overtime, the operation of the hardware components and/or the software components may be updated to change the operation of the computing devices.

SUMMARY

In one aspect, an asset in accordance with one or more embodiments of the invention includes physical computing resources and a physical computing resources manager. The physical computing resources manager obtains a resource update for the asset; makes a determination that the resource update requires a reset of a portion of the physical computing resources; and, based on the determination, resets the portion of the physical computing resources during a low resource consumption reboot of the asset without resetting a second portion of the physical computing resources, the second portion of the physical computing resources are not reset as part of the low resource consumption reboot.

In one aspect, a method for managing an asset in accordance with one or more embodiments of the invention includes obtaining a resource update for the asset, wherein the asset comprises physical computing resources; making a determination that the resource update requires a reset of a portion of the physical computing resources; and, based on the determination, resetting the portion of the physical computing resources during a low resource consumption reboot of the asset without resetting a second portion of the physical computing resources, the second portion of the physical computing resources are not reset as part of the low resource consumption reboot.

In one aspect, a non-transitory computer readable medium in accordance with one or more embodiments of the invention includes computer readable program code, which when executed by a computer processor enables the computer processor to perform a method for managing an asset. The method includes obtaining a resource update for the asset, wherein the asset comprises physical computing resources; making a determination that the resource update requires a reset of a portion of the physical computing resources; and, based on the determination, resetting the portion of the physical computing resources during a low resource consumption reboot of the asset without resetting a second portion of the physical computing resources, the second portion of the physical computing resources are not reset as part of the low resource consumption reboot.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3.1 shows a flowchart of a method of managing an asset in accordance with one or more embodiments of the invention.

FIG. 3.2 shows a flowchart of a method of selectively resetting components of an asset in accordance with one or more embodiments of the invention.

FIG. 4.1 shows a diagram of an example system at a first point in time.

FIGS. 4.2-4.3 show diagrams of interactions between and actions performed by components of the example system of FIG. 4.1 over time.

DETAILED DESCRIPTION

Figure 1:
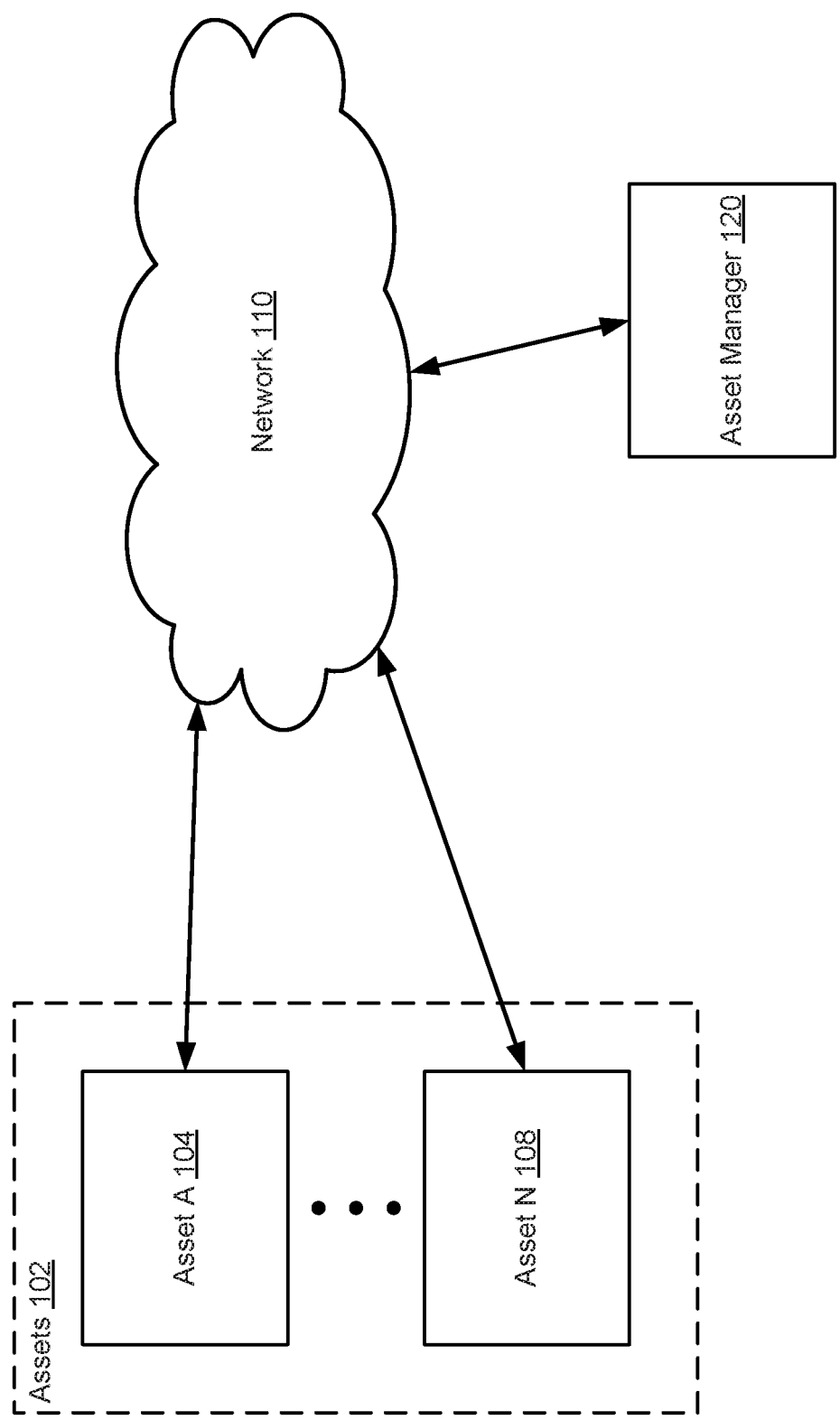
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for updating computing devices. Updating a computing device may change its operation. For example, the manner in which the hardware and/or software components of the computing device may operate in different manners after an update is applied when compared to the manner in which the aforementioned components operated prior to being updated.

A computing device may be updated by, for example, modifying the configuration of hardware components, modifying the firmware, which governs the operation of the hardware components, modifying software components, etc.

An update may require that one or more hardware components of a computing device be restarted for the update to be applied.

A computing device in accordance with embodiments of the invention may preferentially perform low resource consumption reboots. A low resource consumption reboot may be a manner of restarting a computing device that avoids the majority of the steps performed during high resource consumption reboots. The avoided steps may include, for example, one or more of (i) performing an inventory of an computing device, (ii) performing a Power-On Self Test (POST) of the computing device, (iii) identifying a startup component (e.g., a boot device that manages the process of placing components of the computing device in predetermined states) of the computing device, (iv) loading information (e.g., ACPI/SMBIOS) used to manage components of the computing device, (v) loading a manager (e.g., an operating system) of the components of the computing device, (vi) placing entities (e.g., applications) in control of the computing device to facilitate providing of computer implemented services, and (vii) restarting/resetting components of the computing device to cause them to load firmware, update setting, or otherwise modify their operation. By avoiding a portion of the aforementioned steps, the time for performing a low resource consumption reboot may be substantially lower than that required to perform a high resource consumption reboot during which a majority (or all) of the aforementioned steps are performed. Consequently, the update of the computing device may be greatly performed by preferentially performing low resource consumption reboot.

However, performing a low resource consumption reboot may avoid performance of steps that may be required for applying updates to the computing device. For example, all of the hardware components of the computing device may not be restarted thereby causing updates that have been staged for application to not be applied.

Embodiments of the invention may provide methods and systems for ensuring that updates are applied during low resource consumption reboots. Specifically, embodiments of the invention may provide methods and systems that preferentially perform modified low resource consumption reboots of the computing device when updates have been staged for application that require a restart of hardware components for the update to be applied. Performing a modified low resource consumption reboot may cause hardware components of the computing device to be selectively reset (e.g., only those necessary for the update to be applied) during the reboot thereby ensuring that the updates are applied.

By preferentially performing modified low resource consumption reboots, embodiments of the invention may provide a system that ensures updates are applied to computing devices even when low resource consumption reboots are preferentially performed. Consequently, the security of the computing device may be improved while reducing the cognitive burden on users of the computing device for actively selecting and performing different types of reboots to cause updates to be applied.

FIG. 1 shows a system in accordance with one or more embodiments of the invention. The system may include any number of assets (102) that provides computer implemented services. The computer implemented services may include, for example, database services, data storage services, electronic communications services, and/or other types of services that may be implemented using computing devices.

Any number of the assets (e.g., 104, 108) may operate independently or cooperatively to provide the computer implemented services. For example, a single asset (e.g., 104) may provide a computer implemented service on its own (i.e., independently) while multiple other assets may provide a second computer implemented service cooperatively.

To provide the computer implemented services, the assets may utilize computing resources provided by hardware devices of the assets. The computing resources may include, for example, processing resources, storage resources, memory resources, and/or communications resources provided by the hardware devices.

The operation of the assets (102) may be modified at any point in time. For example, the operation of the assets (102) may be modified to provide different computer implemented service, more efficiently utilize computing resources, address deficiencies in provided computer implemented services, or for other reasons.

The system may include an asset manager (120) that manages the operation of the assets (102). To manage the assets (102), the asset manager (120) may send updates to the assets that, when implemented by the assets, modifies the manner in which the assets operate.

When operating and/or to update their operation, the assets (102) may need to be rebooted. Rebooting may refer to a process of placing an asset in a predetermined state. Depending on the predetermined state, performing a reboot may be a computational, time, and/or energy expensive or inexpensive process.

Depending on the desired state, rebooting may include one or more of (i) powering up the asset, (ii) performing an inventory of an asset, (iii) performing a Power-On Self Test (POST) of the asset, (iv) identifying a startup component (e.g., a boot device that manages the process of placing components of the asset in predetermined states) of the asset, (v) loading information (e.g., ACPI/SMBIOS) used to manage components of the asset, (vi) loading a manager (e.g., an operating system) of the components of the asset, (vii) placing entities (e.g., applications) in control of the asset to facilitate providing of computer implemented services, and (viii) restarting/resetting components of the asset to cause them to load firmware, update setting, or otherwise modify their operation. Depending on the number of the aforementioned processes performed as part of a rebooting, the rebooting may be a high computational cost reboot or a low computational cost reboot resulting in the asset being placed in corresponding states.

For example, performing a reboot that includes all of the aforementioned processes may be computationally expensive and time consuming. However, doing so may ensure place the asset in a state that most clearly matches a desired state based on, for example, updates to the operation of the asset that have been obtained by the asset. In contrast, performing a reboot that includes only a portion of the aforementioned processes may be comparatively computationally inexpensive and/or quick. However, doing so may place the asset in a state that does not match the desired state based on, for example, updates to the operation of the asset that have been obtained by the asset.

Embodiments of the invention may provide a system and method for performing a modified low computational cost reboot of an asset that results in the state of the asset more closely matching a desired state of the asset than would be achieved if only a low computational cost reboot of the asset is performed. To do so, the system may monitor obtained updates for the asset to identify a portion of the physical computing resources of the asset that need to be reset to implement the updates and selectively reset only the portion of the physical computing resources during a low computational cost reboot of the asset (e.g., a modified low computational cost reboot). By doing so, the computational cost for restarting all of the physical computing resources of the asset may be avoided while still enabling updates to the operation of the components of the asset to be applied.

The components of the system of FIG. 1 may be operably connected to each other and/or other entities via any combination of wired and/or wireless network. For example, the aforementioned components may each be operably connected to a network (110) that facilitates communications between these components. Each of the components of the system of FIG. 1 are discussed below.

The assets (102) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the assets (102) described in this application and/or all, or a portion, of the methods illustrated in FIGS. 3.1-3.2. The assets (102) may be implemented using other types of computing devices without departing from the invention. For additional details regarding computing devices, refer to FIG. 5.

As noted above, the assets (102) may provide computer implemented services. To do so, the assets (102) may utilize computing resources of the asset. To utilize the computing resources of the assets, the assets (102) may manage the hardware components of the assets that provide the computing resources. Management of hardware components may include periodically rebooting, discussed above.

To reduce the computational cost for rebooting, the assets (102) may selectively perform low computational cost reboots and modified low computational cost reboots. Specifically, the assets (102) may preferentially perform low computational cost reboots over modified low computational cost reboots (e.g., reboots during which components of the assets are restarted). The assets (102) may perform modified low computational cost reboots when updates or other changes to the operation of the assets (102) require that the assets (102) restart the components of the assets for the new operations of the assets (102) to be performed.

For example, the assets (102) may obtain updates (e.g., stage the updates in storage for application) to their operation that may necessitate a restart of one or more components of the assets (102) for the assets to take effect. When the assets (102) performing a reboot, the assets (102) may (i) ascertain whether updates necessitating a reboot of one or more components are staged, (ii) when updates are staged, perform a modified low resource consumption reboot to cause the necessary components to be restarted, and/or (iii) when updates are not staged, perform a low resource consumption reboot to reduce the computational cost of performing a reboot of the asset. By doing so, the computational cost for performing updates may be reduced while still ensuring that updates requiring restarts of components of the asset take effect after a reboot of the asset.

By performing low computational cost reboots and modified low computational cost reboots, an asset in accordance with embodiments of the invention may modify its state in a manner consistent with previously provided changes to its manner of operation while reducing the computational cost for performing such reboots. For example, by avoiding performance of high computational cost reboots the assets in accordance with embodiments disclosed herein may provide higher uptime while ensuring that the assets operate in desired manners by placing the assets in predetermined states following low computational cost reboots.

The assets (102) provides any number of computer implemented services. The computer implemented services may include, for example, file storage services, database services, electronic communication services, etc. The assets (102) may provide other types of computer implemented services without departing from the invention. Each of the assets (e.g., 104, 108) of the assets (102) may provide similar and/or different computer implemented services.

Figure 2:
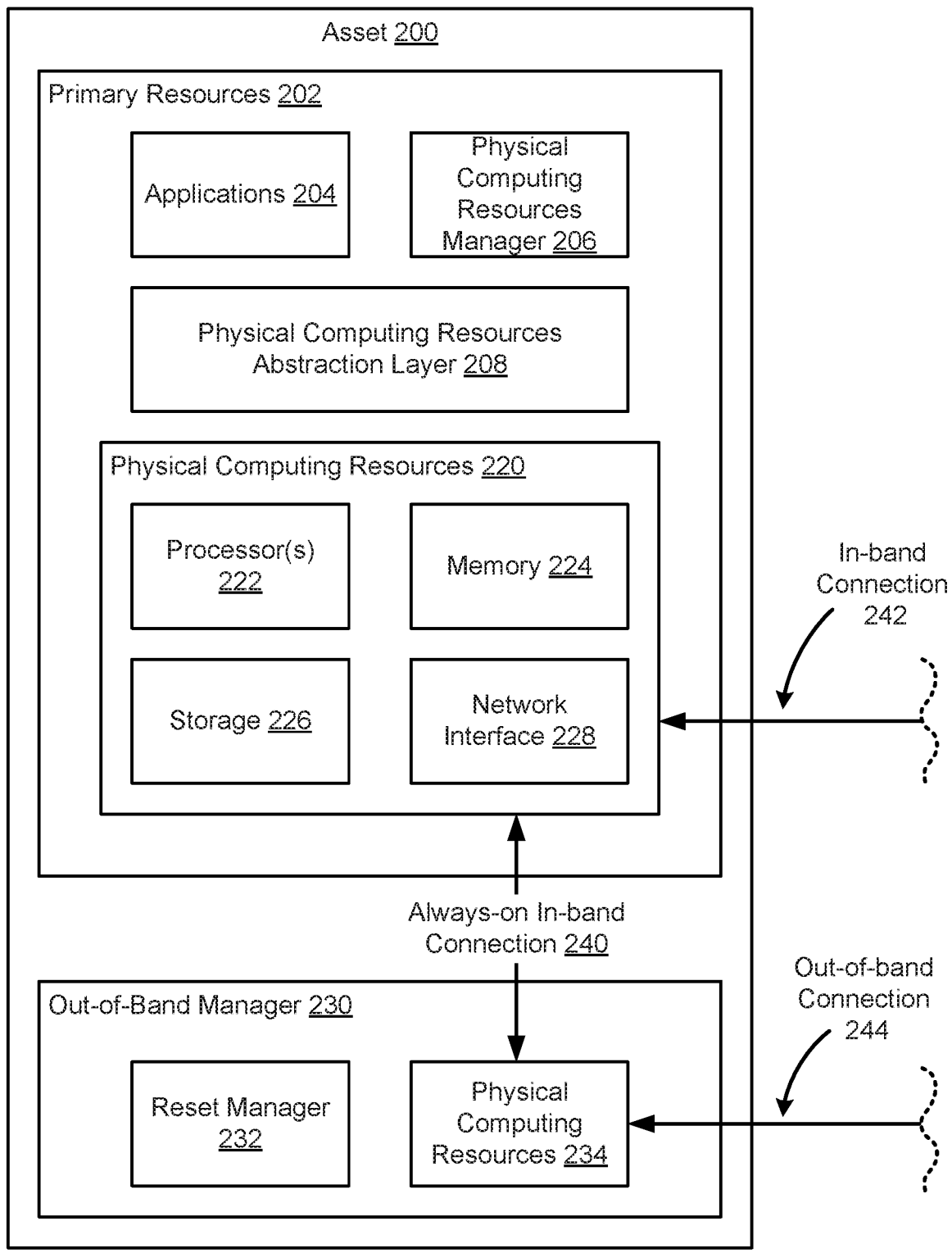
FIG. 2 shows a diagram of an example asset in accordance with one or more embodiments of the invention.

For additional details regarding assets (102), refer to FIG. 2.

The asset manager (120) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the asset manager (120) described in this application and/or all, or a portion, of the methods illustrated in FIGS. 3.1-3.2. The asset manager (120) may be implemented using other types of computing devices without departing from the invention. For additional details regarding computing devices, refer to FIG. 5.

The asset manager (120) may be implemented using logical devices without departing from the invention. For example, the asset manager (120) may be implemented using virtual machines that utilize computing resources of any number of physical computing devices (e.g., refer to FIG. 5) to provide their respective functionalities. The asset manager (120) may be implemented using other types of logical devices without departing from the invention.

While illustrated as a separate entity, the functionality of the asset manager (120) may be implemented via the assets (102). For example, the asset manager (120) may be implemented as a distributed application that executes using the computing resources of the other components of the system of FIG. 1 and/or computing resources of other entities not illustrated in FIG. 1.

In one or more embodiments of the invention, the asset manager (120) provides asset management services. Asset management services may include (i) identifying changes that are to be made to the operation of one or more of the assets (102) (e.g., firmware updates, new software, patches to hosted software, etc.), (ii) distributing the changes (and/or information that enables changes to be made) to the one or more of the assets (102), and/or (iii) verifying that the changes have been made to the operation of the one or more assets (102).

While the system is illustrated in FIG. 1 as including a limited number of specific components, a system in accordance with embodiments of the invention may include additional, fewer, and/or different components from those illustrated in FIG. 1 and/or discussed above without departing from the invention.

As discussed above, assets may manage their reboot behavior to provide computer implemented services in a predetermined manner. FIG. 2 shows a diagram of an example asset (200) in accordance with one or more embodiments of the invention. The example asset (200) may be similar to any of the assets (102) illustrated in FIG. 1.

As discussed above, the example asset (200) may (i) provide computer implemented and (ii) selectively perform different types of reboots to place the asset in desired states following reboots.

The example asset (200) may provide any number of computer implemented services. Each of the computer implemented services may provide similar and/or different functionality.

To provide the computer implemented services, the example asset (200) may host any number of applications (204). The applications (204) may include any number and/or type of applications that are hosted by the primary resources (202). In other word, the applications (204) may execute using the physical computing resources (220) of the primary resources (202). The physical computing resources (220) may be provided using hardware devices including processor(s) (222), memory (224), persistent storage (226), and/or a network interface (228).

For example, the applications (204) may be implemented as computer code, i.e., computer instructions, that when executed by one or more processors (e.g., 222) of the primary resources (202) give rise to the functionality of the applications (204). The computer code corresponding to each of the applications (204) may be stored on the persistent storage (226) of the physical computing resources (220) or in other locations (e.g., locally on other persistent storage or remotely on other devices).

The applications (204) may provide any quantity and type of computer implemented services. A computer implemented service may be, for example, electronic communications services, data management services, database services, etc. Any number and type (local and/or remote) of entities may utilize the computer implemented services provided by the applications (204).

For example, an application hosted by the primary resources (202) may provide electronic mail services to an entity that is remote to the example asset (200). In another example, an application hosted by the primary resources (202) may provide database services to other applications hosted by the primary resources (202) and additional applications hosted by other data processing devices operably connected to the example asset (200).

To selectively perform different types of reboots to place the asset in desired states following reboots, the example asset (200) may include a physical computing resources manager (206) that enables remote entities (e.g., the asset manager discussed in FIG. 1) to provide it with updates to its operation. The updates may be, for example, firmware updates, software updates, changes in configuration of software and/or hardware components, etc.

When the aforementioned updates are obtained, the physical computing resources manager (206) may stage the updates for implementation. Staging may include storing the updates in predetermined locations where corresponding components will look when updating their operation. For example, when updates such as firmware updates for any of the physical computing resources (220) are stored in predetermined locations, the updates may be automatically applied to the physical computing resources (220) when the physical computing resources are restarted. Thus, to apply updates such as firmware to the physical computing resources (220) the corresponding hardware components (e.g., 222, 224, 226, 228) may need to be reset.

To enable the aforementioned components to be restarted, the physical computing resources manager (206) may selectively cause a modified low computational cost reboot to be performed during the next reboot of the asset (200) rather than a low computational cost reboot. To do so, the physical computing resource manager (206) may signal to a physical computing resources abstraction layer (208) that a low computational cost reboot needs to be performed during the next reboot.

By doing so, the example asset (200) may selectively perform different types of reboots to ensure that updates to the operation of the asset are implemented.

To enable the applications (204) to efficiently utilize the physical computing resources (220), the example asset (200) may include a physical computing resources abstraction layer (208). The physical computing resources abstraction layer (208) may manage the physical computing resources (220) for use by the applications (204) and/or other entities). Managing the physical computing resources (220) may include selectively performing different types of reboots to ensure that updates to the operation of the example asset (200) are applied. To selectively perform different types of reboots, the physical computing resources abstraction layer (208) may (i) identify when updates to the operation of the asset (200) are staged and (ii) when updates are staged, restart the corresponding hardware components during a reboot using the out-of-band manager (230). During a reboot, the physical computing resources abstraction layer (208) may notify the out-of-band manager (230) of hardware components that need to be restarted and wait until the out-of-band manager (230) has restarted the hardware components during the process of rebooting the example asset (200).

The physical computing resources abstraction layer (208) may be implemented as, for example, a basic input/output system (BIOS) hosted by the example asset (200) that initialized hardware components during reboot, provide runtime services for the applications, and/or performs other functions.

In one or more embodiments of the invention, the physical computing resources manager (206) and/or physical computing resources abstraction layer (208) is implemented using a hardware device including circuitry. The hardware device may be, for example, a digital signal processor, a field programmable gate array, or an application specific integrated circuit. The physical computing resources manager (206) and/or physical computing resources abstraction layer (208) may be other types of hardware devices without departing from the invention.

In one or more embodiments of the invention, the physical computing resources manager (206) and/or physical computing resources abstraction layer (208) is implemented using computing code stored on a persistent storage (e.g., 226) that when executed by a processor performs the functionality of the physical computing resources manager (206) and/or physical computing resources abstraction layer (208). The processor may be a hardware processor (e.g., 222) including circuitry such as, for example, a central processing unit or a microcontroller. The processor may be other types of hardware devices for processing digital information without departing from the invention.

The example asset (200) may include an out-of-band manager (230). The out-of-band manager (230) may manage restarting of any of the hardware components of the physical computing resources (220) during modified low computational cost reboots of the example asset (200). To do so, the out-of-band manager (230) may (i) obtain a list of components to be restarted during a next reboot from the physical computing resources abstraction layer (208), (ii) verify that updates (e.g., firmware updates) have been appropriately stated (e.g., stored at predetermined locations), and/or (iii) restart the components for which updates have been appropriately staged.

To provide the aforementioned functionality, the out-of-band manager (230) may be operably connected to the primary resources (202) of the example asset (200) via an always-on in-band connection (240). The always-on in-band connection (240) may enable the primary resources (202) and the out-of-band manager (230) to communicate with each other without using the in-band connection (242) or the out-of-band connection (244) that are used by the aforementioned components of the example asset (200) to communicate with other entities.

To provide its functionality, the out-of-band manager (230) may include a reset manager (232) and physical computing resources. The reset manager (232) may provide the functionality of the out-of-band manager, discussed above. The out-of-band manager (232) may utilize physical computing resources (234) of the out-of-band manager to provide its functionality. The physical computing resources (234) may include persistent storage (not shown) that may store computer code corresponding to the out-of-band manager (230) that when executed by processor(s) (not shown) of the physical computing resources (234) cause the reset manager (232) to perform the functionality of the out-of-band manager (230).

The out-of-band manager (230) may be implemented as a hardware device. For example, the out-of-band manager (230) may be implemented as a circuit card hosted by the example asset (200). The out-of-band manager (230) may operate as a computing device separate from the example asset (200).

The out-of-band manager (230) may be implemented as a logical entity. For example, the out-of-band manager (230) may be implemented using a virtual machine hosted by the example asset (200) that utilizes virtual resources for its execution. In such a scenario, the out-of-band connection (244) and the always-on in-band connection (240) may be implemented as virtual connections supported by logical network interfaces maintained by the example asset (200). The primary resources (202) and the out-of-band manager (230) may each be allocated separate end points on a virtual network supported by the example asset (200).

While illustrated in FIG. 2 as being a portion of the example asset (200), the out-of-band manager (230) may be implemented as a separate physical device without departing from the invention. For example, the primary resources (202) of the example asset (200) may be implemented using a first rack mount server operably connected to a second rack mount server that is used to implement the out-of-band manager (230). The operable connection between the primary resources (202) and the out-of-band manager (230) may serve as an always-on in-band connection (240) while other interconnects serve as the in-band connection (242) and the out-of-band connection.

While the example asset (200) of FIG. 2 is illustrated as including a limited number of specific component, an asset in accordance with embodiments of the invention may include additional, fewer, and/or different components without departing from the invention.

As discussed above, the system of FIG. 1 may manage the states of assets by performing different types of reboots of the assets. FIGS. 3.1-3.2 show methods that may be performed by components of the system of FIG. 1 to manage the states of the assets.

FIG. 3.1 shows a flowchart of a method in accordance with one or more embodiments of the invention. The method depicted in FIG. 3.1 may be performed to reboot an asset in accordance with one or more embodiments of the invention. The method shown in FIG. 3.1 may be performed by, for example, an asset (e.g., 102, FIG. 1). Other components of the system in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, a resource update for an asset is obtained. The resource update may enable an operation of the asset to be updated. In other words, applying the resource update to the asset may cause the asset to operate in a different manner to prior to applying the update.

In one or more embodiments of the invention, the resource update is obtained from an asset manager (e.g., 120, FIG. 1). The resource update may be obtained, for example, by receiving the asset update via a message from the asset manager, by downloading the resource update from another device (e.g., the asset manager or another device operably connected to the asset), or by any other method.

In one or more embodiments of the invention, the resource update is staged after it is obtained. Staging the resource may include, for example, storing the resource update in a predetermined location.

In one or more embodiments of the invention, the resource update is an update for a physical computing resource of the asset. For example, the resource update may be a change in configuration of the physical computing resource, a firmware update for the physical computing resource, or any other type of update that results in a change in the operation of the physical computing resource after the update is applied to the physical computing resource.

In one or more embodiments of the invention, the resource update requires that the physical computing resource be reinitialized. Reinitializing the physical computing resource may enable the resource update to be applied. The physical computing resource may be reinitialized by restarting, resetting, or otherwise causing the physical computing resource to perform a predetermined process that causes the resource update to be applied.

For example, reinitializing the physical computing resource may be accomplished by restarting the physical computing resource as part of rebooting the asset. However, the asset may not reinitialize its physical computing resources when performing a reboot. The asset may, by default, perform a low resource consumption reboot of the asset that does not include reinitializing (e.g., restarting) its physical computing resources.

In one or more embodiments of the invention, the resource update is an update for a logical entity (e.g., application or other entity that uses the physical computing resources of the asset) hosted by the asset. For example, the resource update may be a change in configuration of the logical entity, change in the code that when executed gives rise to the logical entity, or any other type of update that results in a change in the operation of the logical entity after the update is applied to the physical computing resource.

Like the physical computing resources, applying the resources update to the logical entity may require that one or more physical computing resources of the asset be reinitialized.

While the resource update has been described above with respect to a single change to the operation of the asset, the resource update may include any number of changes to any number of components of the asset without departing from the invention. For example, the resource update may include multiple firmware updates, configuration changes, etc.

In step 302, it is determined whether the resource update requires a reset of a portion of the physical computing resources of the asset. The determination may be made, for example, (i) based on the type of the resource update, (ii) based on information provided along with or as part of the resource update (e.g., a note indicating that a reset of a component needs to be made) or from another source (e.g., another device may store a repository of such information and may provide the information in response to queries), or (iii) via any other method without departing from the invention.

If it is determined that the resource update requires a reset of a portion of the physical computing resources of the asset, the method may proceed to step 304. If it is determined that the resource update does not require a reset of any physical computing resources, the method may end following step 302.

In step 304, the first portion of the physical computing resources is reset during a low resource consumption reboot of the asset without resetting a second portion of the physical computing resources of the asset. In other words, a modified low computing resource consumption reboot of the asset is performed that results in the selective reset of only the portion of the physical computing resources of the asset that need to be restarted for the resource update to take effect.

In one or more embodiments of the invention, the reset of the first portion of the physical computing resources during the low resource consumption reset of the asset without resetting the second portion of the physical computing resources via the method illustrated in FIG. 3.2. The reset of the first portion of the physical computing resources during the low resource consumption reset of the asset without resetting the second portion of the physical computing resources may be performed via other methods without departing from the invention.

In one or more embodiments of the invention, resetting the first portion of the physical computing resources causes the resource update to be applied. By having the resource update be staged at a predetermined location, the first portion of the physical computing resource may automatically apply the update upon being reset (e.g., by the process by which the physical computing resources reinitializing themselves upon restart).

In one or more embodiments of the invention, applying the resource update causes a firmware update for the first portion of the physical computing resources to be applied. By applying the firmware update, the operation of the first portion of the physical computing resource may be modified in a manner consistent with the resource update.

In one or more embodiments of the invention, the low resource consumption reboot is initiated by a user. For example, a user of the asset may initiate the reboot. The low resource consumption reboot may be initiated for other reasons without departing from the invention. For example, the low resource consumption reboot may be initiated in accordance with a schedule of when reboots are to be performed, upon the occurrence of a condition that triggers a reboot, etc.

The method may end following step 304.

Thus, via the method illustrated in FIG. 3.1, an asset in accordance with embodiments of the invention may selectively perform different types of reboots to minimize the computational cost for performing reboots while ensuring that updates to the operation of the asset are implemented upon reboot.

As discussed, above, assets may selectively reset components during reboots.

FIG. 3.2 shows a flowchart of a method in accordance with one or more embodiments of the invention. The method depicted in FIG. 3.2 may be used to selectively reset components of an asset in accordance with one or more embodiments of the invention. The method shown in FIG. 3.2 may be performed by, for example, an asset (e.g., 102, FIG. 1). Other components of the system in FIG. 1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 310, the portion of the physical computing resources (e.g., the first portion discussed with respect to step 304 of FIG. 3.1) are marked for reset during the next low resource consumption reboot of the asset. The portion of the physical computing resource may be marked for reset by, for example, providing a list of the hardware devices of the portion of the physical computing resources to a physical computing resources abstraction layer (e.g., 208, FIG. 2) that performs reboots of the asset.

For example, if the physical computing abstraction layer is implemented as a BIOS or other type of management layer, the list of the hardware devices may be provided by calling an interrupt that places the asset into a management mode in which the list of hardware devices may be stored in storage space that which the BIOS may access during any subsequent reboot. By storing the list of the hardware devices in an appropriate storage space location, the BIOS or other type of management layer may automatically determine during a future reboot whether any devices need to be reset for corresponding updates to be applied.

The portion of the physical computing resources may include any number of physical computing resources. In other words, none, one, or multiple.

In step 312, a low resource consumption reboot of the asset is initiated. The low resource consumption reboot of the asset may be initiated for any reason. For example, the reason may be that the low resource consumption reboot was previously scheduled, a user of the asset initiated a reboot, a command for performing the reboot was received, or for any other reason.

In step 314, it is determined whether any physical computing resources of the asset are marked for reset. The determination may be made, for example, by a physical computing resources abstraction layer that is managing the low computing resource consumption reboot of the asset. The determination may be made, for example, by ascertaining whether a predetermined storage locations (e.g., in persistent storage and/or memory) including information such as a list of hardware components that need to be reset. If such information is in the predetermined storage location, it may be determined that at least one physical computing resource of the asset is marked for reset.

If any of the physical computing resources are marked for reset, the method may proceed to step 316. If no physical computing resources are marked for reset, the method may proceed to step 320.

In step 316, an out-of-band manager is notified of the portion of the physical computing resources of the asset that is marked for reset. The out-of-band manager may be notified by, for example, sending a message to the out-of-band manager via (i) an always-on in-band connection or (ii) an in-band connection and an out-of-band connection (e.g., via an external network). The message may include a list of hardware components of the asset corresponding to the physical computing resources of the asset. The notification may be provided to the out-of-band manager by an abstraction layer of the asset, a physical computing resources manager, or another entity that is a part of the primary resources of the asset.

The out-of-band manager may be notified of the portion of the physical computing resources of the asset that is marked for reset via other methods without departing from the invention. For example, the list may be stored in a predetermined storage or memory location that is accessible by the out-of-band manager. The out-of-band manager may automatically read such lists during low resources consumption reboots of the asset.

In step 318, the portion of the physical computing resources of the asset are reset using the out-of-band manager. The portion of the physical computing resources may be reset by, for example, the out-of-band manager sending reset messages to each of the physical computing resources included in the portion of the physical computing resources. Such messages may be sent, for example, via an always-on in-band connection that operably connects the out-of-band manager to the physical computing resources. In response to such messages, each of the physical computing resources may reset thereby reinitializing each of the physical computing resources that received the messages. By doing so, only a select number of physical computing resources may be reset during the low resource consumption reboot of the asset.

Resetting the portion of the physical computing resources may cause a resource update to be applied to the portion of the physical computing resources. For example, the configurations may be changed, new firmware may be loaded, and/or any number of other changes may be made resulting the operation of the portion of the physical computing resources to be changed following being reset.

Upon being reset, the portion of the physical computing resources may notify the out-of-band manager and/or an entity managing the reboot of the asset that the physical computing resources have been reset. Consequently, the out-of-band manager and/or an entity managing the reboot may ascertain that the operation of the aforementioned physical computing resources has been updated in accordance with a resource update. If only the out-of-band manager is notified, the out-of-band manager may notify the entity managing the reboot of the asset.

The entity managing the low resource consumption reboot of the asset may wait until the portion of the physical computing resources are reset before completing the low resource consumption reboot of the asset. For example, the entity managing the reboot of the asset may wait until confirmation of resets of the portion of the physical computing resources are received before completing the low resource consumption reboot of the asset.

By performing steps 316 and 318, the asset may perform a modified low resource consumption reboot. Performance of the modified low resource consumption reboot may selectively cause physical computing resources of the asset to be restarted resulting in staged resource updates to be applied to the portion of the physical computing resources. Consequently, the operation of the asset may be changed subsequently to performance of the reboot. In contrast, only performing a low resource consumption reboot may not result in a change in the operation of the asset because the resource update may not have been applied for lack of reset of one or more of the physical computing resources of the asset. While steps 316 and 318 performed, all, or a portion, of the low resource consumption reboot may be suspended.

In step 320, the low resource consumption reboot of the asset is completed without resetting any of the physical computing resources of the asset that are not marked for reset. By doing so, the computational cost for ensuring that a resource update is applied may be reduced when compared to the computational cost for resetting all of the physical computing resources of the asset and/or performing a high resource consumption reboot.

The method may end following step 320.

Thus, via the method illustrated in FIG. 3.2, an asset in accordance with embodiments of the invention may selectively reset a number of physical computing resources during a low resource consumption reboot. By doing so, embodiments of the invention may provide an asset that ensures resource updates are applied while limiting the computational cost for performing reboots.

To further clarify embodiments of the invention, a non-limiting example is provided in FIGS. 4.1-4.3. FIG. 4.1 shows a system similar to that illustrated in FIG. 1. FIGS. 4.2-4.3 illustrate interactions between components and/or actions performed by the components of the system of FIG. 4.1 over time. For the sake of brevity, only a limited number of components of the system of FIG. 1 are illustrated in each of FIGS. 4.1-4.3.

Example

Consider a scenario as illustrated in FIG. 4.1 in which an asset (402) is being managed by an asset manager (400). At a first point in time, the asset manager (400) obtains a hard disk firmware update (404) for the asset (402). To manage the asset (402), the asset manager (400) provides the asset (402) with a copy of the hard disk firmware update (404).

Turning to FIGS. 4.2-4.3, the aforementioned figures illustrate interactions and actions between components of the system of FIG. 4.1. In these figures, the relative occurrence in time of the interactions progresses from the top of each figure (i.e., earlier in time) to the bottom of each figure (i.e., later in time). FIG. 4.3 is a continuation of the diagram of FIG. 4.2. In other words, element 420 indicates the first interaction that occurs in time while element 444 indicates the last interaction that occurs.

Turning to FIG. 4.2, at the first point in time, a physical computing resources manager (410) of the asset (402) obtains the update (420). In response to obtaining the update (420), the physical computing resources manager (410) sends the firmware update (422) to a hard disk (416) of the asset (402) for storage. Specifically, the firmware update (422) is sent for storage at a predetermined location in the hard disk (416) which stages the firmware update for application. To state the firmware, the hard disk (416) stores the firmware update (424) at the predetermined location after receiving the firmware update (422).

The physical resource manager (410) identifies that the firmware update (422) for the hard disk (416) requires a rest of the hard disk (416) for application. Because the asset (402) is set to perform low computing resource consumption reboots, the physical computing resources manager (410)

sends a hard disk reset notification (426) to the physical computing resources abstraction layer (412) of the asset (402).

In response to obtaining the notification (426), the physical computing resources abstraction layer (412) stores the notification (427). To store the notification (426), the asset enters a management mode thereby enabling reserved storage (e.g., onboard storage) to be used to store the notification (426).

After the notification is stored, time passes until it is time for the asset (402) to be rebooted (e.g., a scheduled reboot). The physical computing resources abstraction layer (412) initiates a low resource consumption reboot (430) of the asset (402) which does not include resetting of the hardware components of the asset (402).

As part of performing the low computing resource consumption reboot, the physical computing resources abstraction layer (412) checks the reserved storage and identifies that the notification (432) is present.

Turning to FIG. 4.3, in response to identifying that the notification is present, the physical computing resources abstraction layer (412) identifies that the hard disk (416) should be reset and sends a hard disk reset notification (434) to a reset manager (414) of an out-of-band management (not shown) of the asset (402).

In response to receiving the hard disk reset notification (434), the reset manager (414) sends a reset (436) message to the hard disk (416) via an always-on in-band connection that operably connects the out-of-band manager and the hard disk (416). In response to receiving the reset (436) command, the hard disk (416) resets itself and applies the stored firmware update (438) as part of the reset process. The hard disk (416) then sends a reset acknowledgement (440) message to the reset manager (414) via the always-on in-band connection.

In response to receiving the reset acknowledgement (440) message, the reset manager (414) sends a reset notification (442) to the physical computing resources abstraction layer (412) to indicate that the low resource consumption reboot (444) can proceed. In response to receiving the reset notification (440), the physical computing resources abstraction layer (412) completes the low resources consumption reboot (444) of the asset (402).

End of Example

Thus, as illustrated in FIGS. 4.1-4.3, embodiments of the invention may provide a system that enables assets to be efficiently rebooted while still ensuring that resource updates are applied. For example, by selectively only resetting components of the asset that are impacted by the resource updates, the computational cost for performing the update may be reduced when compared to methods of performing reboots that include resetting of any components that are not impacted by the resource update.

Figure 5:
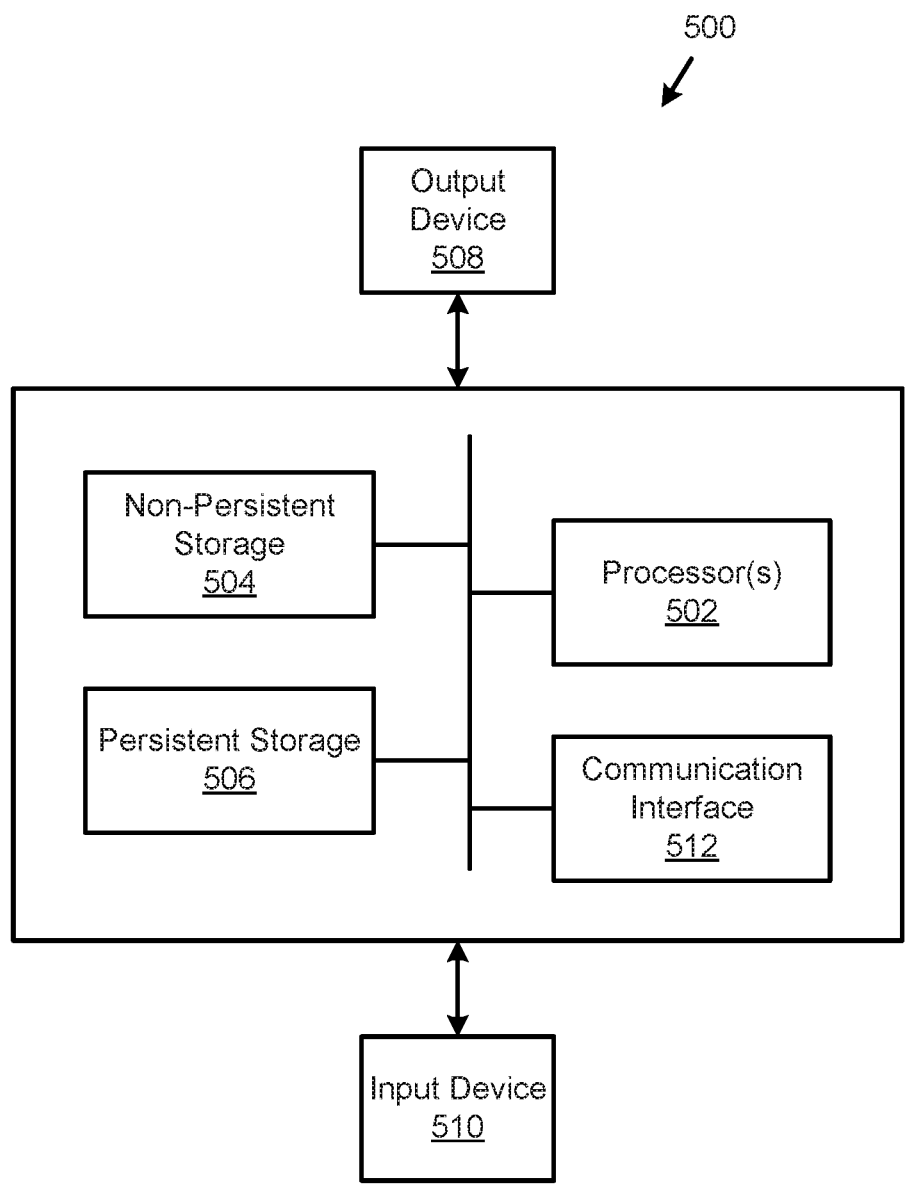
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for performing low resource consumption reboots of devices. To do so, embodiments of the invention may provide a system that selectively restarts components when performing a low resource consumption reboot. By selectively restarting components, the computational cost for performing a reboot may be reduced by avoiding the computational cost for restarting components that do not need to be reset for updates to be applied to the system. Consequently, the (i) computational cost for performing a reboot when updates need to be applied may be reduced, (ii) the time required to perform an update when updates need to be applied may be reduced, (iii) the security of the system may be improved by automatically ensuring that updates are appropriately applied, and/or (iv) the cognitive burden on users of the system may be reduced by removing the need for users to selectively perform different types of reboots depending on whether or not components of the system need to be restarted for updates to be applied.

Thus, embodiments of the invention may address the problems of limited computing resources in systems that are updated over time and limited cognitive resources of users of the system.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. An asset, comprising:
   physical computing resources; and
   a physical computing resources manager programmed to:
     obtain a resource update for the asset, wherein the resource update comprises information specifying one or more of the physical computing resources that require a reset after the resource update is executed;
     make a determination, using the information in the resource update, that the resource update requires the reset of only a portion of the physical computing resources; and
     based on the determination, reset the portion of the physical computing resources during a low resource consumption reboot of the asset without resetting a second portion of the physical computing resources, wherein
       the second portion of the physical computing resources is not reset as part of the low resource consumption reboot,
       prior to performing the low resource consumption reboot of the asset, marking the portion of the physical computing resources for reset during the low resource consumption reboot, and
       during the low resource consumption reboot:
         making a second determination that the portion of the physical computing resources is marked for reset, and
         in response to the second determination, resetting, using an out-of-band manager, the portion of the physical computing resources of the asset, wherein resetting comprises:
           notifying the out-of-band manager of the portion of the physical computing resources of the asset; and
           sending, by the out-of-band manager, reset messages to the portion of the physical computing resources via an always-on in-band connection between the out-of-band manager and the physical computing resources.

2. The asset of claim 1, wherein the out-of-band manager is hosted by the asset.

3. The asset of claim 1, wherein the resource update comprises a firmware update for a physical computing resource of the portion of the physical computing resources.

4. The asset of claim 1, wherein the physical computing resources manager is further programmed to:
   obtain a second resource update for the asset;
   make a second determination that the second resource update does not require a reset of any of the physical computing resources; and
   based on the second determination, perform a second low resource consumption reboot of the asset without resetting any of the physical computing resources.

5. The asset of claim 1, wherein the second portion of the physical computing resources comprises all of the physical computing resources other than the portion of the physical computing resources.

6. A method for managing an asset, comprising:
   obtaining a resource update for the asset, wherein the asset comprises physical computing resources, and wherein the resource update comprises information specifying one or more of the physical computing resources that require a reset after the resource update is executed;
   making a determination, using the information in the resource update, that the resource update requires the reset of only a portion of the physical computing resources; and
   based on the determination, resetting the portion of the physical computing resources during a low resource consumption reboot of the asset without resetting a second portion of the physical computing resources, wherein
     the second portion of the physical computing resources is not reset as part of the low resource consumption reboot,
     prior to performing the low resource consumption reboot of the asset, marking the portion of the physical computing resources for reset during the low resource consumption reboot, and
     during the low resource consumption reboot:
       making a second determination that the portion of the physical computing resources is marked for reset, and
       in response to the second determination, resetting, using an out-of-band manager, the portion of the physical computing resources of the asset, wherein resetting comprises:
         notifying the out-of-band manager of the portion of the physical computing resources of the asset; and
         sending, by the out-of-band manager, reset messages to the portion of the physical computing resources via an always-on in-band connection between the out-of-band manager and the physical computing resources.

7. The method of claim 6, wherein the out-of-band manager is hosted by the asset.

8. The method of claim 6, wherein the resource update comprises a firmware update for a physical computing resource of the portion of the physical computing resources.

9. The method of claim 6, further comprising: obtaining a second resource update for the asset;
   making a second determination that the second resource update does not require a reset of any of the physical computing resources; and
   based on the second determination, performing a second low resource consumption reboot of the asset without resetting any of the physical computing resources.

10. The method of claim 6, wherein the second portion of the physical computing resources comprises all of the physical computing resources other than the portion of the physical computing resources.

11. A non-transitory computer readable medium comprising computer readable program code, which when executed by a computer processor enables the computer processor to perform a method for managing an asset, the method comprising:
    obtaining a resource update for the asset, wherein the asset comprises physical computing resources, wherein the resource update comprises information specifying one or more of the physical computing resources that require a reset after the resource update is executed;
    making a determination, using the information in the resource update, that the resource update requires the reset of only a portion of the physical computing resources; and based on the determination, resetting the portion of the physical computing resources during a low resource consumption reboot of the asset without resetting a second portion of the physical computing resources, wherein:
the second portion of the physical computing resources is not reset as part of the low resource consumption reboot,
prior to performing the low resource consumption reboot of the asset, marking the portion of the physical computing resources for reset during the low resource consumption reboot, and
during the low resource consumption reboot:
making a second determination that the portion of the physical computing resources is marked for reset, and
in response to the second determination, resetting, using an out-of-band manager, the portion of the physical computing resources of the asset wherein resetting comprises:
notifying the out-of-band manager of the portion of the physical computing resources of the asset; and
sending, by the out-of-band manager, reset messages to the portion of the physical computing resources via an always-on in-band connection between the out-of-band manager and the physical computing resources.

12. The non-transitory computer readable medium of claim 11, wherein the out-of-band manager is hosted by the asset.

13. The non-transitory computer readable medium of claim 11, wherein the resource update comprises a firmware update for a physical computing resource of the portion of the physical computing resources.

14. The non-transitory computer readable medium of claim 11, wherein the method further comprises:
obtaining a second resource update for the asset;
making a second determination that the second resource update does not require a reset of any of the physical computing resources; and
based on the second determination, performing a second low resource consumption reboot of the asset without resetting any of the physical computing resources.

\* \* \* \* \*